US011729208B2

(12) United States Patent
Kimura et al.

(10) Patent No.: US 11,729,208 B2
(45) Date of Patent: Aug. 15, 2023

(54) IMPACT RANGE ESTIMATION APPARATUS, IMPACT RANGE ESTIMATION METHOD, AND COMPUTER-READABLE RECORDING MEDIUM

(71) Applicant: NEC Corporation, Tokyo (JP)

(72) Inventors: Keigo Kimura, Tokyo (JP); Daichi Hasumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 17/276,973

(22) PCT Filed: Sep. 25, 2018

(86) PCT No.: PCT/JP2018/035512
§ 371 (c)(1),
(2) Date: Mar. 17, 2021

(87) PCT Pub. No.: WO2020/065737
PCT Pub. Date: Apr. 2, 2020

(65) Prior Publication Data
US 2022/0038467 A1 Feb. 3, 2022

(51) Int. Cl.
*H04L 9/40* (2022.01)
(52) U.S. Cl.
CPC ...... *H04L 63/145* (2013.01); *H04L 2463/146* (2013.01)
(58) Field of Classification Search
CPC ............ H04L 63/145; H04L 2463/146; H04L 63/1433; G06F 21/56
See application file for complete search history.

(56) References Cited

U.S. PATENT DOCUMENTS

2005/0091538 A1  4/2005  Hoche et al.
2009/0320136 A1* 12/2009  Lambert ............... G06F 21/566
726/25
(Continued)

FOREIGN PATENT DOCUMENTS

EP        1528452 A1    5/2005
JP      2015-095159 A    5/2015
(Continued)

OTHER PUBLICATIONS

English translation of Written opinion for PCT Application No. PCT/JP2018/035512, dated Jan. 8, 2019.
(Continued)

*Primary Examiner* — Ali S Abyaneh
(74) *Attorney, Agent, or Firm* — Sughrue Mion, PLLC

(57) ABSTRACT

An impact range estimation apparatus 10 estimates a range of impact due to infection by malware in a network system with a plurality of nodes. The impact range estimation apparatus 10 includes: a reverse propagation probability calculation unit 11 configured to, when a specific node is infected with the malware, based on scenario information that specifies a pattern of attack by the malware and a communications log in the network system before infection by the malware, for each node other than the specific node, calculate a probability that the malware propagates from that other node to the specific node; and a simulation execution unit 12 configured to, using the calculated probability, execute a plurality of times a simulation in which the malware is propagated to the specific node, and for each other node, calculate a number of times that that node becomes a propagation source of the malware.

15 Claims, 14 Drawing Sheets

(56) References Cited

U.S. PATENT DOCUMENTS

| | | | | |
|---|---|---|---|---|
| 2010/0212013 A1* | 8/2010 | Kim | ................... | H04L 63/1425 |
| | | | | 709/224 |
| 2015/0264062 A1* | 9/2015 | Hagiwara | ............... | G06F 21/55 |
| | | | | 726/24 |
| 2016/0285894 A1* | 9/2016 | Nelms | ................... | H04L 63/145 |
| 2017/0019415 A1* | 1/2017 | Takano | ................... | G06F 21/56 |

FOREIGN PATENT DOCUMENTS

| | | |
|---|---|---|
| JP | 2016-184870 A | 10/2016 |
| JP | 2017-211978 A | 11/2017 |
| WO | 2014/087597 A1 | 6/2014 |

OTHER PUBLICATIONS

International Search Report for PCT Application No. PCT/JP2018/035512, dated Jan. 8, 2019.

* cited by examiner

Fig.4

SCENARIO INFORMATION

| NAME | LATENCY TIME | WEIGHTING RULE SET (IF-THEN RULE SET) |
|---|---|---|
| WinRM / SHORT-TERM/RULE1 | 1 hour | • all edge weight = 0.2;<br>• if session dst port = 5985 \|\| session dst port = 5986; edge weight = 0.7; |
| WinRM / SHORT-TERM/RULE2 | 3 hour | • all edge weight = 0.2;<br>• if session dst port = 5985 \|\| session dst port = 5986; edge weight = 0.7; |
| ⋮ | ⋮ | ⋮ |
| WinRM / LONG-TERM/RULE1 | 30 days | • all edge weight = 0.2;<br>• if session dst port = 5985 \|\| session dst port = 5986; edge weight = 0.7; |
| ⋮ | ⋮ | ⋮ |
| EternalBlue / SHORT-TERM/RULE1 | 6 hour | • all edge weight = 0.2;<br>• if session dst port = 445; edge weight = 0.7;<br>• if session dst port = 445 && session packet count < 4; edge weight = 0.4; |
| EternalBlue / SHORT-TERM/RULE2 | 7 days | • all edge weight = 0.2;<br>• if session dst port = 445; edge weight = 0.7;<br>• if session dst port = 445 && session packet count < 4; edge weight = 0.4; |
| ⋮ | ⋮ | ⋮ |

Fig.5

COMMUNICATIONS HISTORY

| Time | Duration | Src IP | Src Port | Dst IP | Dst Port | Protocol | Packet Number | Sent Byte | Receive Byte |
|---|---|---|---|---|---|---|---|---|---|
| 1512086400 | 0 | 192.168.0.2 | 49168 | 192.168.0.3 | 5986 | 6 | 8 | 1865 | 0 |
| 1512086400 | 0 | 192.168.0.2 | 51495 | 192.168.0.5 | 80, | 6 | 1, | 46 | 24 |
| 1512086401 | 0 | 192.168.0.4 | 50232 | 192.168.2.8 | 445 | 6 | 13 | 2822 | 30482 |
| 1512086401 | 0 | 192.168.0.3 | 49445 | 192.168.2.8 | 53 | 17 | 6 | 1738 | 0 |
| ⋮ | ⋮ | ⋮ | ⋮ | ⋮ | ⋮ | ⋮ | ⋮ | ⋮ | ⋮ |

Fig.6
(a)
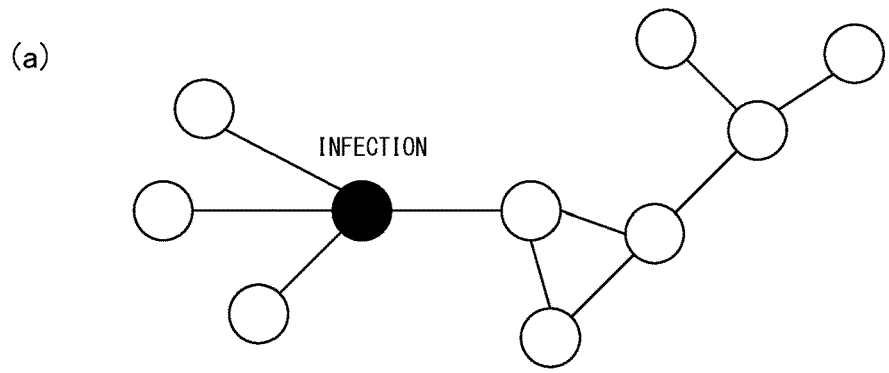
(b)
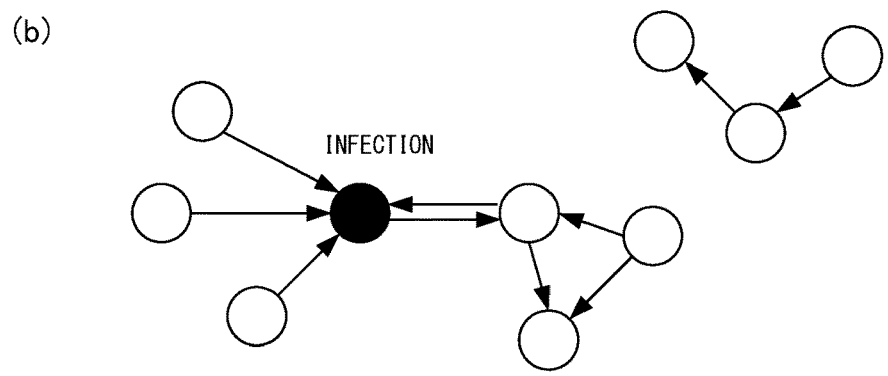
(c)
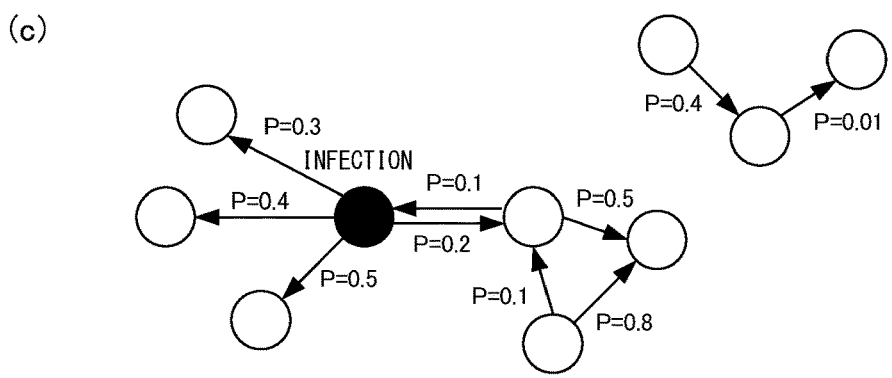
(d)
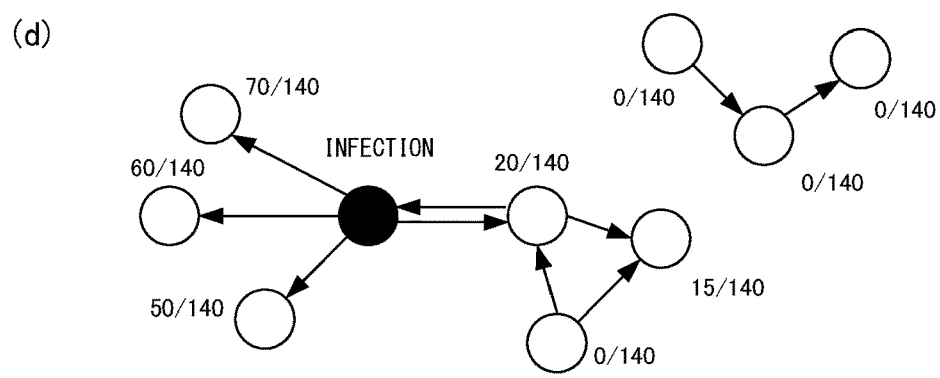

Fig.9
(a)
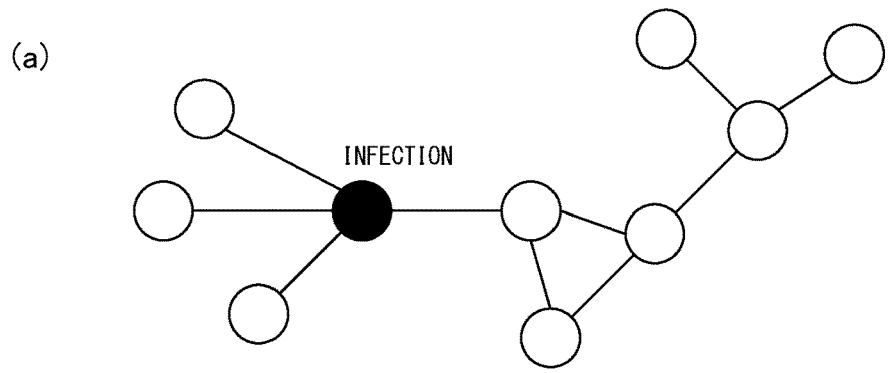
(b)
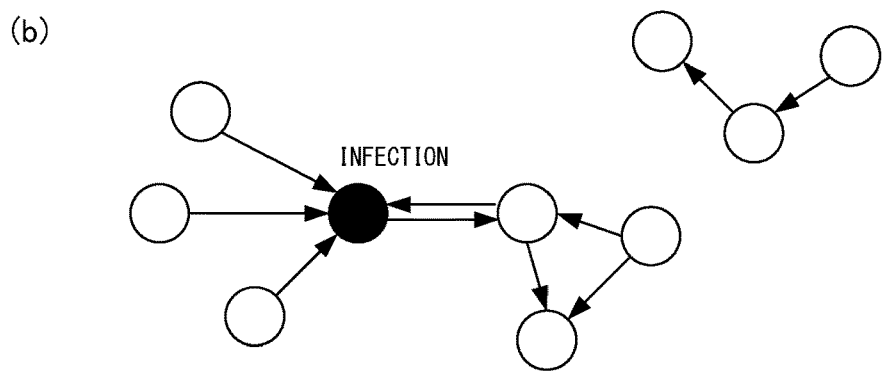
(c)
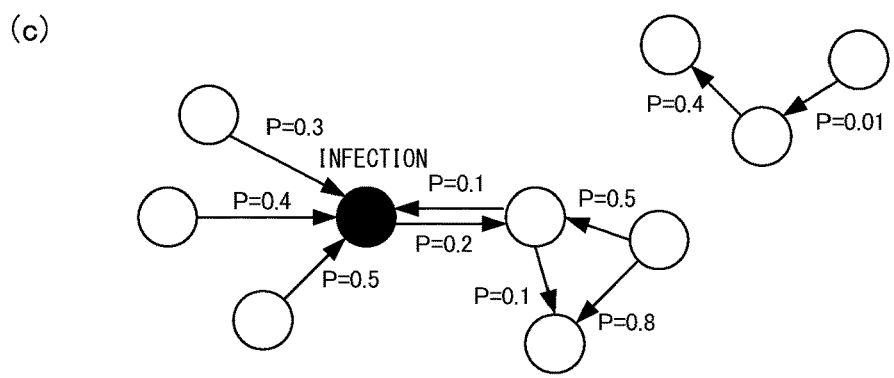
(d)
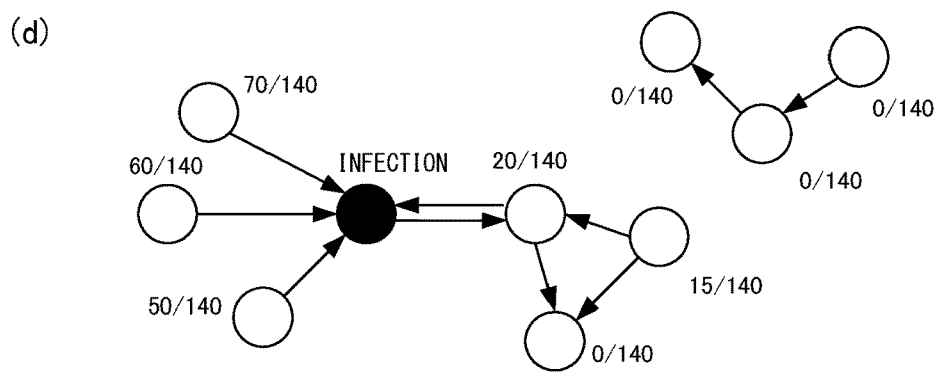

Fig.12
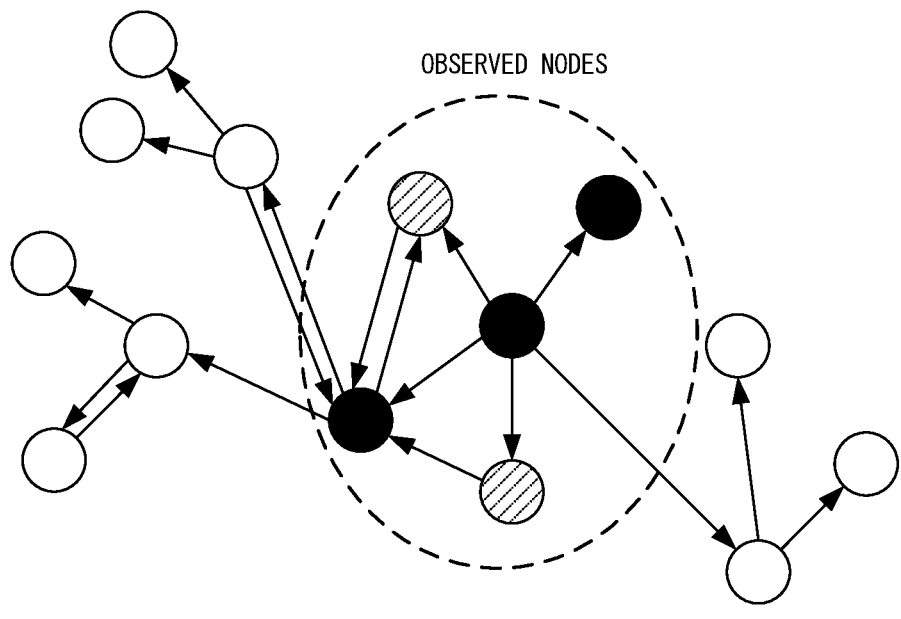
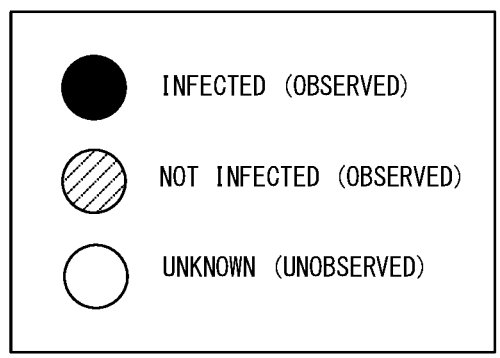

IMPACT RANGE ESTIMATION APPARATUS, IMPACT RANGE ESTIMATION METHOD, AND COMPUTER-READABLE RECORDING MEDIUM

This application is a National Stage Entry of PCT/JP2018/035512 filed on Sep. 25, 2018, the contents of all of which are incorporated herein by reference, in their entirety.

TECHNICAL FIELD

The present invention relates to an impact range estimation apparatus and an impact range estimation method that estimate a range of impact on a network system when malware invades the network system, and further relates to a computer-readable recording medium where a program for realizing these is recorded.

BACKGROUND ART

In recent years, there has been an increase in standard attacks in which malicious programs called malware are caused to invade network systems of companies, government offices, or the like to illegally acquire confidential information such as technical information and personal information. When a standard attack is received, companies, government offices, or the like may suffer great damage, or interference with the operation of a computer system.

In such a case, once the computer system is stopped, the malware infection can be easily stopped, and the malware can be completely removed. However, it is practically impossible to stop a computer system in a company, a government office, or the like. Therefore, there are demands to accurately estimate the range of impact on a network system due to a malware infection.

In order to answer such demands, for example, Patent Document 1 discloses an apparatus that evaluates the risk of a secondary infection by malware. Specifically, the apparatus disclosed in Patent Document 1 specifies an infection route when malware infects another terminal from a terminal assumed to be infected with malware, and evaluates the risk of the specified infection route based on security function information of each device on a network. According to the apparatus disclosed in Patent Document 1, it is possible to estimate the range of impact of the malware without stopping the system.

Also, Patent Document 2 discloses an apparatus for specifying the range of impact on a network system when malware invades the network system. The apparatus disclosed in Patent Document 2 records network configuration information in chronological order and holds this information. Also, when a specific terminal is invaded by malware, the apparatus disclosed in Patent Document 2 specifies the time of invasion, and further, extracts configuration information corresponding to the specified time, and presents the extracted configuration information to an administrator of the network system.

According to the apparatus disclosed in Patent Document 2, even if the network configuration of the target network system is changed, the administrator can know the network configuration at the time when the malware invasion occurred, so the range of impact of that malware invasion can be specified.

LIST OF RELATED ART DOCUMENTS

Patent Documents

Patent Document 1: Japanese Patent Laid-Open Publication No. 2015-095159

Patent Document 2: Japanese Patent Laid-Open Publication No. 2016-184870

SUMMARY OF INVENTION

Problems to be Solved by the Invention

However, although the apparatus disclosed in Patent Document 1 evaluates the route to the infection destination from the terminal infected with malware, this apparatus does not evaluate the route from the infection source of that terminal. Therefore, it is thought that the apparatus disclosed in Patent Document 1 has low accuracy when estimating the range of impact of the malware.

Further, in the apparatus disclosed in Patent Document 2, it is necessary for the network system administrator to manually specify the range of impact of the malware based on the network configuration at the time of the malware infection, so there is the problem that there is a large burden on the administrator.

An example object of the invention is to provide an impact range estimation apparatus, an impact range estimation method, and a computer-readable recording medium that solve the above-described problems, and that, when malware invades a network system, without imposing a burden on an administrator, can improve accuracy when estimating the range of impact of the malware.

Means for Solving the Problems

In order to achieve the example object described above, according to an example aspect of the invention, in an impact range estimation apparatus that estimates a range of impact due to infection by malware in a network system with a plurality of nodes, the impact range estimation apparatus includes:

a reverse propagation probability calculation unit configured to, when a specific node is infected with the malware, based on scenario information that specifies a pattern of attack by the malware and a communications log in the network system before infection by the malware, for each node other than the specific node, calculate a probability that the malware propagates from that other node to the specific node; and a simulation execution unit configured to, using the calculated probability, execute a plurality of times a simulation in which the malware is propagated to the specific node, and for each other node regarding which the probability was calculated, calculate a number of times that the other node becomes a propagation source of the malware.

Also, in order to achieve the example object described above, according to an example aspect of the invention, in an impact range estimation method for estimating a range of impact due to infection by malware in a network system with a plurality of nodes, the impact range estimation method includes:

(a) a step of, when a specific node is infected with the malware, based on scenario information that specifies a pattern of attack by the malware and a communications log in the network system before infection by the malware, for each node other than the specific node, calculating a probability that the malware propagates from that other node to the specific node; and (b) a step of, using the calculated probability, executing a plurality of times a simulation in which the malware is propagated to the specific node, and for each other node regarding which the probability was calculated, calculating a number of times that the other node becomes a propagation source of the malware.

Furthermore, in order to achieve the example object described above, a computer-readable recording medium according to an example aspect of the invention includes a program for estimating a range of impact due to infection by malware in a network system with a plurality of nodes, the program being recorded on the computer-readable recording medium and including instructions that cause the computer to carry out:

(a) a step of, when a specific node is infected with the malware, based on scenario information that specifies a pattern of attack by the malware and a communications log in the network system before infection by the malware, for each node other than the specific node, calculating a probability that the malware propagates from that other node to the specific node; and (b) a step of, using the calculated probability, executing a plurality of times a simulation in which the malware is propagated to the specific node, and for each other node regarding which the probability was calculated, calculating a number of times that the other node becomes a propagation source of the malware.

Advantageous Effects of the Invention

As described above, according to the invention, when malware invades a network system, without imposing a burden on an administrator, it is possible to improve accuracy when estimating the range of impact of the malware.

BRIEF DESCRIPTION OF THE DRAWINGS

FIG. 4 shows an example of scenario information used in the first example embodiment of the present invention.

FIG. 5 shows an example of a communications history used in the first example embodiment of the present invention.

FIGS. 6A to 6D illustrate an example of processing to calculate a reverse propagation probability and a number of reverse propagations in the first example embodiment of the present invention, each of which involves a series of main steps.

FIGS. 9A to 9D illustrate an example of processing to calculate a propagation probability and a number of propagations in the second example embodiment of the present invention, each of which involves a series of main steps.

FIG. 12 illustrates scenario selection processing in the third example embodiment.

EXAMPLE EMBODIMENT

First Example Embodiment

Below, an impact range estimation apparatus, an impact range estimation method, and a computer-readable recording medium according to the first example embodiment of the present invention will be described with reference to FIGS. 1 to 7.

Apparatus Configuration

Figure 1:
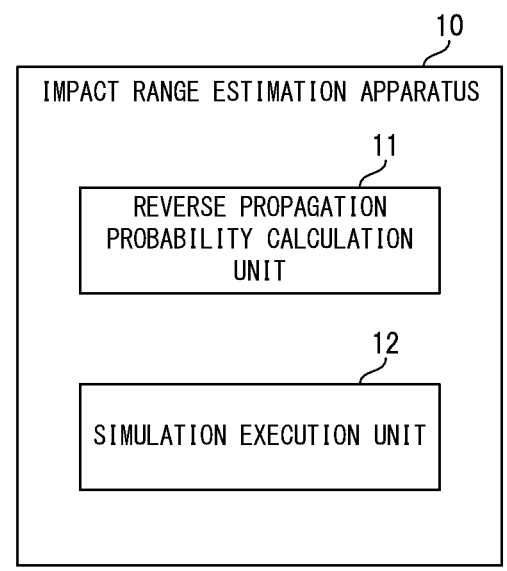
FIG. 1 is a block diagram showing a schematic configuration of an impact range estimation apparatus according to a first example embodiment of the present invention.

First, the schematic configuration of an impact range estimation apparatus 10 according to the present first example embodiment will be described. FIG. 1 is a block diagram showing the schematic configuration of the impact range estimation apparatus according to the first example embodiment of the present invention.

The impact range estimation apparatus 10 according to the first example embodiment shown in FIG. 1 is an apparatus for estimating a range of impact due to infection by malware in a network system with a plurality of nodes. As shown in FIG. 1, the impact range estimation apparatus 10 includes a reverse propagation probability calculation unit 11 and a simulation execution unit 12.

When a specific node is infected with malware, the reverse propagation probability calculation unit 11, based on scenario information and a communications log, for each node other than the specific node, calculates a probability that the malware propagates from that other node to the specific node (hereinafter referred to as "reverse propagation probability"). Also, the scenario information is information that specifies a pattern of attack by the malware. Furthermore, the communications log is a communications log in the network system before infection by the malware.

The simulation execution unit 12, using the probability calculated by the reverse propagation probability calculation unit 11, executes a plurality of times a simulation in which the malware is propagated to the specific node, and for each other node regarding which the probability was calculated, calculates a number of times that each other node becomes a propagation source of the malware.

As described above, in the present example embodiment, when the specific node is infected with malware, the impact range estimation apparatus 10 calculates a "number of times" that it is possible to become a propagation source, as an index indicating the possibility that a node other than the specific node becomes a propagation source. Therefore, according to the present example embodiment, when malware invades a network system, without imposing a burden on an administrator, it is possible to improve accuracy when estimating the range of impact of the malware.

Figure 2:
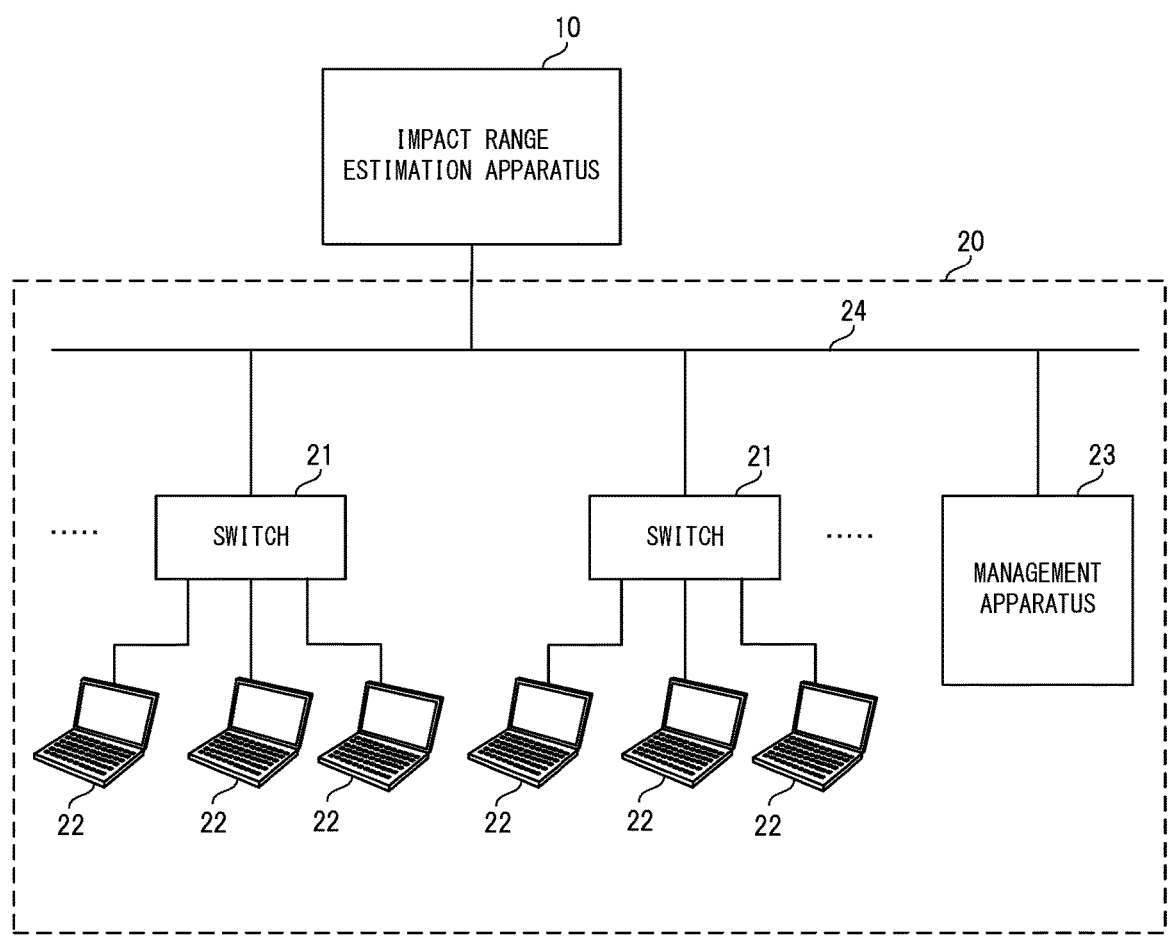
FIG. 2 shows an example of a network system that is the target of estimation by the impact range estimation apparatus 10 according to the first example embodiment of the present invention.
Figure 3:
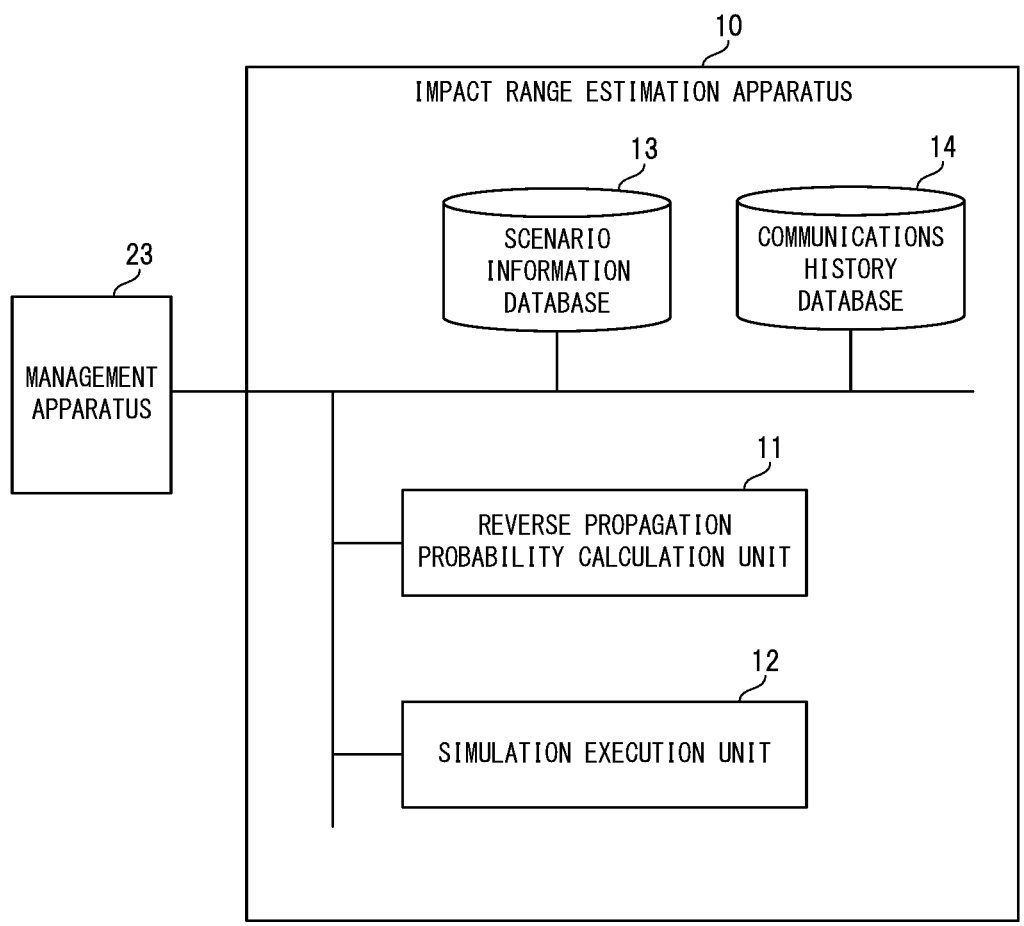
FIG. 3 is a block diagram more specifically showing the configuration of the impact range estimation apparatus according to the first example embodiment of the present invention.

Next, the specific configuration of the impact range estimation apparatus 10 according to the first example embodiment will be described with reference to FIGS. 2 to 6. FIG. 2 shows an example of a network system that is the target of estimation by the impact range estimation apparatus 10 according to the first example embodiment of the present invention. FIG. 3 is a block diagram more specifically showing the configuration of the impact range estimation apparatus according to the first example embodiment of the present invention.

As shown in FIG. 2, in the present example embodiment, the network system 20 includes a plurality of switches 21, a plurality of nodes (terminal devices) 22, a management apparatus 23, and a network 24 that is a LAN (Local Area Network) or the like connecting these. The impact range estimation apparatus 10 is connected to the network 24. In the network system 20, each node 22 is connected to the network 24 through a switch 21. In addition, the management apparatus 23 manages the malware infection status of each node 22.

Specifically, the management apparatus 23 collects information sent from security software embedded in each node 22, and based on the collected information, determines whether or not each node 22 is infected with malware. Then, when the management apparatus 23 has determined that any of the nodes 22 is infected with the malware, the management apparatus 23 transmits information that specifies the node infected with the malware (hereinafter referred to as "infection information") to the impact range estimation apparatus 10 through the network 24.

Also, as shown in FIG. 3, the impact range estimation apparatus 10 in the first example embodiment includes a scenario information database 13 and a communications history database 14, in addition to the reverse propagation probability calculation unit 11 and the simulation execution unit 12.

The scenario information database 13, for example, stores the scenario information shown in FIG. 4. FIG. 4 shows an example of the scenario information used in the first example embodiment of the present invention. As shown in FIG. 4, the scenario information includes a plurality of scenarios set for each malware pattern of attack, and each scenario includes a name, a latency time, and a weighting rule set.

In the example of FIG. 4, in each scenario, the name includes a combination of the name of the malware, a tendency (long-term or short-term) of the latency time of the malware, and a number of the weighting rule set corresponding to the malware. Also, the latency time indicates the time from when the malware infects to the time when the malware starts its activity.

The weighting rule set is a rule for calculating the reverse propagation probability according to the pattern of attack by the malware. Also, the weighting rule set specifies a destination port of the node infected by the malware as a pattern of attack by the malware.

The communications history database 14, for example, stores a communications log history (hereinafter referred to as a "communications history") shown in FIG. 5. FIG. 5 shows an example of the communications history used in the first example embodiment of the present invention. As shown in FIG. 5, the communications history includes a session start time (Time), a session duration (Duration), a source IP (Src IP), a source port (Src Port), a destination IP (Dst IP), a destination port (Dst Port), a protocol number (Protocol), a packet number (Packet Number), sent bytes (Sent Byte), and received bytes (Receive Byte) for each communication log.

In the present example embodiment, the reverse propagation probability calculation unit 11 first acquires the infection information transmitted from the management apparatus 23, and from the acquired infection information, specifies the node infected with the malware (hereinafter referred to as the "infected node") and the time when that node was infected (hereinafter referred to as the "infection time").

Next, from the communications history stored in the communications history database 14, the reverse propagation probability calculation unit 11 extracts the communications log in the past relative to the infection time. Also, the reverse propagation probability calculation unit 11 specifies the direction of communications in the extracted communications log, that is, the source and the destination.

Then, the reverse propagation probability calculation unit 11 swaps the directions of communications, that is, the source and the destination. Further, the reverse propagation probability calculation unit 11, in this state, applies the weighting rule set of the scenario information stored in the scenario information database 13, and calculates the reverse propagation probability for each node other than the infected node. The calculated reverse propagation probability indicates the probability that the other node propagated the malware to the infected node. Note that in the first example embodiment, it is assumed that the scenario to be used has been designated in advance from among the plurality of scenarios included in the scenario information.

In the present example embodiment, the simulation execution unit 12 executes, a set number of times, a simulation in which the malware is propagated to the infected node, using the calculated reverse propagation probability for each node other than the infected node, and calculates the number of times the other node caused the malware to propagate to the infected node (hereinafter referred to as the "number of reverse propagations").

Here, the processing by the reverse propagation probability calculation unit 11 and the simulation execution unit 12 will be specifically described with reference to FIGS. 6A to 6D. FIGS. 6A to 6D illustrate an example of processing to calculate a reverse propagation probability and a number of reverse propagations in the first example embodiment of the present invention, each of which involves a series of main steps. Further, in FIGS. 6A to 6D, the circular drawings indicate the respective nodes.

As shown in FIG. 6A, when the management apparatus 23 transmits the infection information, the reverse propagation probability calculation unit 11 specifies the infected node that is infected with the malware and the infection time, based on the transmitted infection information.

Next, as shown in FIG. 6B, the reverse propagation probability calculation unit 11 extracts the communications log in the past relative to the time when the infected node was infected, based on the communications history stored in the communications history database 14. In FIG. 6B, the arrow direction indicates the direction of communications.

Next, the reverse propagation probability calculation unit 11 acquires the designated scenario from the scenario information database 13. Then, the reverse propagation probability calculation unit 11 swaps the source and the destination in each extracted communications log, applies the communications log in a swapped state to the weighting rule set of the acquired scenario, and calculates the reverse propagation probability. Thus, as shown in FIG. 6C, in the past relative to the time when the infected node was infected, the reverse propagation probability is calculated for each other node that has communicated with the infected node.

For example, assume that "WinRM/Short-term/Rule 1" is specified as a scenario. In this scenario, the latency time is 1 hour, and the weighting rule set is "if session dst port=5985||=5986; edge weight=0.7; else edge weight=0.2".

In this case, the reverse propagation probability calculation unit 11 extracts the communications log within the past one hour from the time T when the infected node was infected with the malware, and in the extracted communications log, swaps information between the receiving node and the transmitting node. Specifically, the reverse propagation probability calculation unit 11 swaps "SrcIP" and "DstIP", and furthermore swaps "SrcPort" and "DstPort". Note that if the communications log includes information regarding the operating system, device, and software, this information is also swapped.

Then, the reverse propagation probability calculation unit 11 applies the swapped communications log to the weighting rule set of the scenario "WinRM/Short-term/Rule 1" and calculates the reverse propagation probability. As a result, the reverse propagation probability of the node whose "DstPort" is 5985 or 5986 is calculated to be 0.7, and the reverse propagation probability of other nodes is calculated to be 0.2. As a result, an information propagation model is constructed as shown in FIG. 6C.

Next, as shown in FIG. 6D, the simulation execution unit 12 executes, for each node other than the infected node, for example 100 times, a simulation using the information propagation model shown in FIG. 6C. In the simulation, the number of reverse propagations in which the other node caused the malware to propagate to the infected node is calculated.

Specifically, because the number of times the simulation is executed is 100, the simulation execution unit 12, in each simulation instance t=0, 1, 2, . . . 100, determines whether or not each node caused the infected node to be infected with the malware, based on the reverse propagation probability of each node. The number of times determined that each node caused the malware to propagate to the infected node is used as the number of reverse propagations.

Also, the simulation execution unit 12 displays the calculated number of reverse propagations for each node on a screen of the terminal device used by the administrator of the network system 20, for example. As a result, the administrator of the network system 20 can estimate the range of impact due to the malware from the displayed results of each node.

Apparatus Operations

Figure 7:
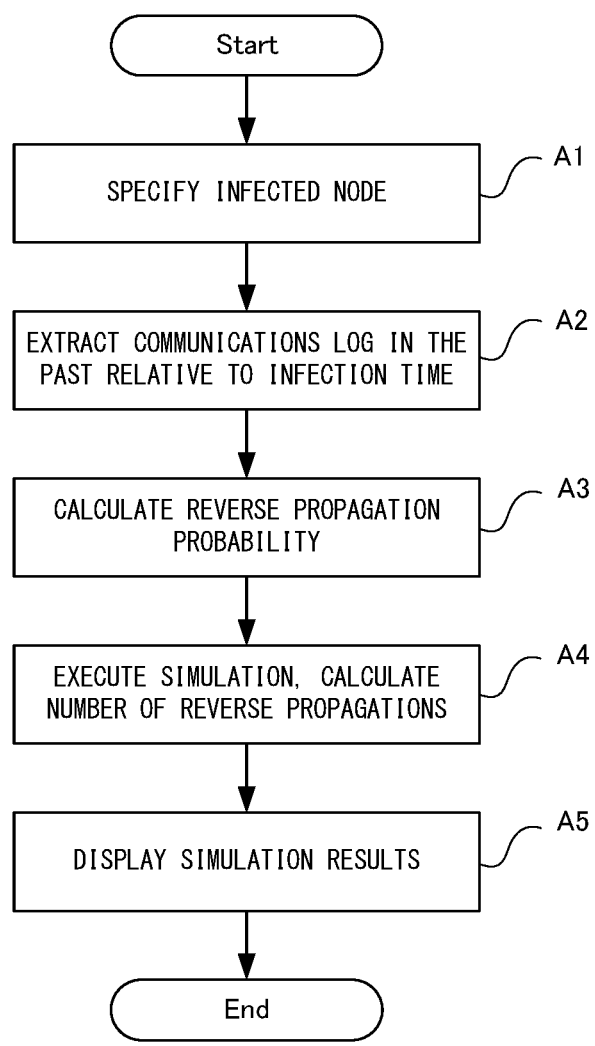
FIG. 7 is a flowchart showing operation of the impact range estimation apparatus according to the first example embodiment of the present invention.

Next, operation of the impact range estimation apparatus 10 according to the first example embodiment of the present invention will be described with reference to FIG. 7. FIG. 7 is a flowchart showing operation of the impact range estimation apparatus according to the first example embodiment of the present invention. In the following description, FIGS. 1 to 6 will be referred to as appropriate. Further, in the first example embodiment, an impact range estimation method is implemented by operating the impact range estimation apparatus 10. Therefore, the description of the impact range estimation method in the first example embodiment is replaced with the following description of the operation of the impact range estimation apparatus 10.

As shown in FIG. 7, first, the reverse propagation probability calculation unit 11 acquires the infection information transmitted from the management apparatus 23, and from the acquired infection information, specifies the infected node infected with the malware (step A1). Also, in step A1, the reverse propagation probability calculation unit 11 also specifies the infection time when the infected node was infected with the malware.

Next, based on the communications history stored in the communications history database 14, the reverse propagation probability calculation unit 11 extracts the communications log in the past relative to the infection time (step A2). Also, in step A2, the reverse propagation probability calculation unit 11 specifies the direction of communications in the extracted communications log, that is, the source and destination.

Next, the reverse propagation probability calculation unit 11 swaps the communications direction in the communications log extracted in step A2, and in that state, applies the weighting rule set of the designated scenario, and calculates the reverse propagation probability for each node other than the infected node (step A3).

Next, the simulation execution unit 12 executes, a set number of times, a simulation in which the malware is propagated to the infected node, using the reverse propagation probability calculated in step A3 for each node other than the infected node. Then, the simulation execution unit 12, from the simulation results, for each other node, calculates the number of times the other node caused the malware to propagate to the infected node (number of reverse propagations) in the simulations (step A4).

Afterward, the simulation execution unit 12 displays the number of reverse propagations of each node calculated in step A4 on the screen of the terminal device used by the administrator of the network system 20, for example (step A5). By executing step A5, the processing in the impact range estimation apparatus 10 is temporarily ended, but when another node is newly infected with the malware, step A1 is executed again.

Effects of First Example Embodiment

As described above, in the first example embodiment, when a certain node becomes an infected node, the impact range estimation apparatus 10 executes a simulation and calculates the number of reverse propagations for each of the other nodes, and presents the calculated number of reverse propagations to the administrator of the network system 20. Therefore, the administrator of the network system 20 can estimate the range of impact due to the malware from the displayed number. According to the present example embodiment, when malware invades a network system, without imposing a burden on an administrator, it is possible to improve accuracy when the administrator estimates the range of impact of the malware.

[Program]

The program according to the first example embodiment may be a program that causes a computer to execute steps A1 to A5 shown in FIG. 7. By installing this program in a computer and executing the program, the impact range estimation apparatus 10 and the impact range estimation method according to the first example embodiment can be realized. In this case, a processor of the computer performs processing to function as the reverse propagation probability calculation unit 11 and the simulation execution unit 12.

Further, in the first example embodiment, the scenario information database 13 and the communications history database 14 can be realized by storing data files that form those databases in a storage device such as a hard disk provided in the computer.

Also, the program according to the first example embodiment may be executed by a computer system constructed by a plurality of computers. In this case, for example, each computer may respectively function as any of the reverse propagation probability calculation unit 11 and the simulation execution unit 12. Further, the scenario information database 13 and the communications history database 14 may be constructed on a computer different from the computer that executes the program according to the first example embodiment.

Second Example Embodiment

Next, an impact range estimation apparatus, an impact range estimation method, and a computer-readable recording medium according to the second example embodiment of the present invention will be described with reference to FIGS. 8 to 10.

Apparatus Configuration

First, the configuration of an impact range estimation apparatus 30 according to the second example embodiment will be described. FIG. 8 is a block diagram showing the configuration of the impact range estimation apparatus according to the second example embodiment of the present invention.

Figure 8:
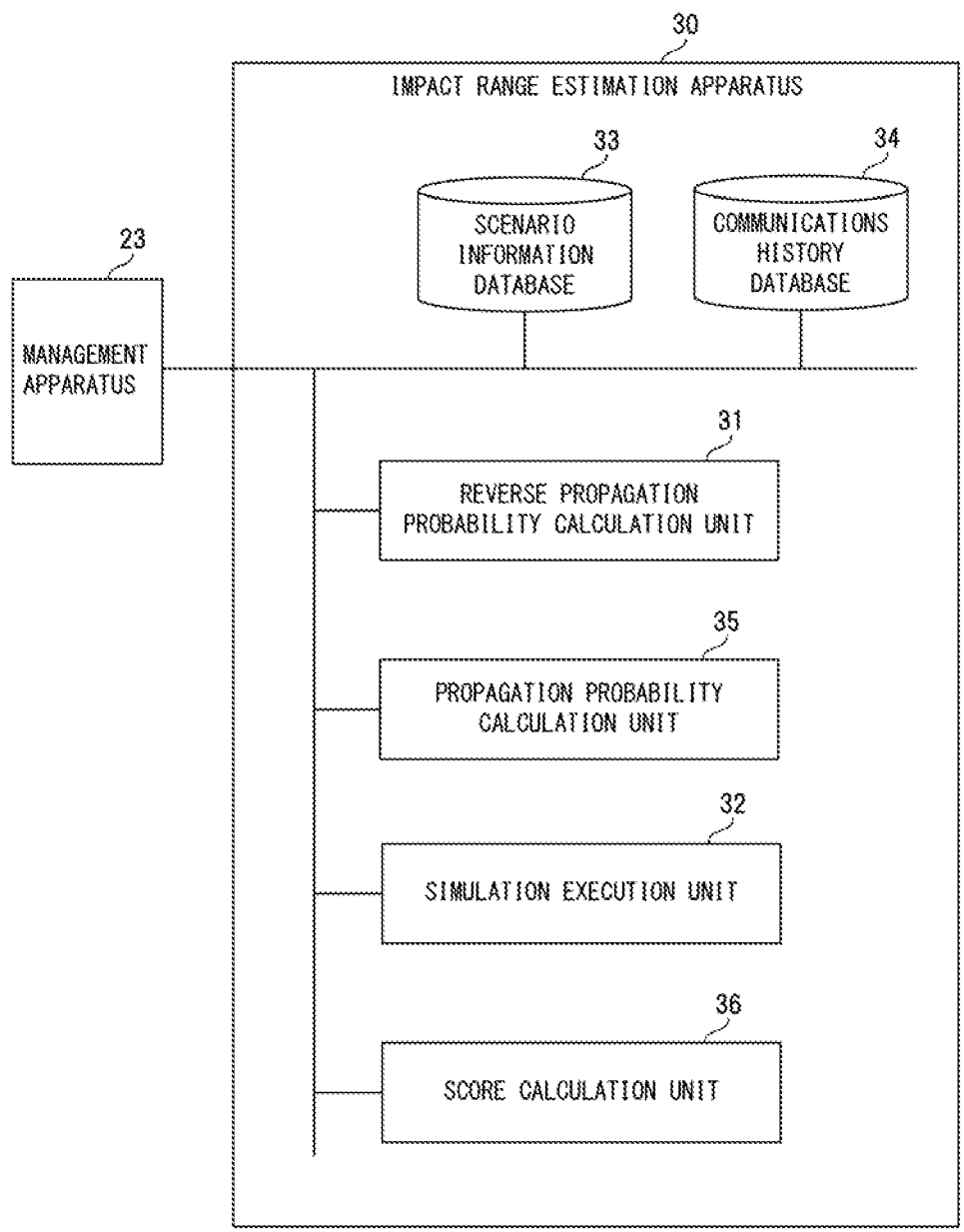
FIG. 8 is a block diagram showing the configuration of an impact range estimation apparatus according to a second example embodiment of the present invention.

As shown in FIG. 8, the impact range estimation apparatus 30 in the second example embodiment includes a reverse propagation probability calculation unit 31, a simulation execution unit 32, a scenario information database 33, and a communications history database 34. These have the same functions as the reverse propagation probability calculation unit 11, the simulation execution unit 12, the scenario information database 13, and the communications history database 14 shown in FIG. 3 in the first example embodiment. With respect to these points, the impact range estimation apparatus 30 in the second example embodiment is the same as the impact range estimation apparatus 10 in the first example embodiment shown in FIG. 3.

However, in the second example embodiment, the impact range estimation apparatus 30 further includes a propagation probability calculation unit 35 and a score calculation unit 36 in addition to the above configuration, and with respect to these points, the impact range estimation apparatus 30 differs from the impact range estimation apparatus 10 in the first example embodiment. Below, mainly the differences from the first example embodiment will be described.

When a specific node is infected with malware, the propagation probability calculation unit 35, based on scenario information and a communications log after the malware infection, for each node other than the infected node, calculates a probability that the malware propagates to that node (hereinafter referred to as "propagation probability").

Specifically, the propagation probability calculation unit 35 first acquires the infection information transmitted from the management apparatus 23, and from the acquired infection information, specifies the node infected with the malware (hereinafter referred to as the "infected node") and the time when that node was infected (hereinafter referred to as the "infection time").

Next, the propagation probability calculation unit 35 extracts a communications log in the future relative to the infection time from the communications history stored in the communications history database 14. Then, the propagation probability calculation unit 35 applies the weighting rule set of the scenario information stored in the scenario information database 13 to the extracted communications log, and calculates the propagation probability for each node other than the infected node. The calculated propagation probability indicates the probability that the infected node propagated the malware to the node group. Note that in the second example embodiment, it is assumed that the scenario to be used has been designated in advance from among the plurality of scenarios included in the scenario information.

In the second example embodiment, the simulation execution unit 32, in addition to calculating the number of reverse propagations, also calculates the number of times a node other than the infected node becomes a malware propagation destination (hereinafter referred to as the "number of propagations"). Specifically, the simulation execution unit 32 executes, a plurality of times, a simulation in which the malware propagates from the infected node to the other node, using the calculated propagation probability, and calculates a number of propagations for each other node regarding which the propagation probability was calculated.

Here, the processing by the propagation probability calculation unit 35 and the simulation execution unit 32 will be specifically described with reference to FIGS. 9A to 9D. FIGS. 9A to 9D illustrate an example of processing to calculate a propagation probability and a number of propagations in the second example embodiment of the present invention, each of which involves a series of main steps. Further, in FIGS. 9A to 9D, the circular drawings indicate the respective nodes.

As shown in FIG. 9A, when the management apparatus 23 transmits the infection information, the propagation probability calculation unit 35, same as the reverse propagation probability calculation unit 31, specifies the infected node that is infected with the malware and the infection time, based on the transmitted infection information. Note that a configuration may be adopted in which specification of the infected node and the infection time is executed by only any one of the reverse propagation probability calculation unit 31 and the propagation probability calculation unit 35, and the other of those units acquires information of the specified infection node and infection time from the unit that executed the specification.

Next, as shown in FIG. 9B, the propagation probability calculation unit 35 extracts the communications log in the future relative to the time when the infected node was infected, based on the communications history stored in the communications history database 34. In FIG. 9B, the arrow direction indicates the direction of communications.

Next, the propagation probability calculation unit 35 acquires the designated scenario from the scenario information database 33. Then, the propagation probability calculation unit 35 applies each acquired communications log to the weighting rule set of the acquired scenario, and calculates the propagation probability. Thus, as shown in FIG. 9C, with respect to the future relative to the time when the infected node was infected, the propagation probability is calculated for each other node that has communicated with the infected node.

For example, same as in the example in FIG. 6 in the first example embodiment, assume that "WinRM/Short-term/Rule 1" is designated as a scenario. In this scenario, the latency time is 1 hour, and the weighting rule set is "if session dst port=5985||=5986; edge weight=0.7; else edge weight=0.2".

In this case, the propagation probability calculation unit 35 extracts the communications log after 1 hour from the time T when the infected node was infected with the malware. Then, the propagation probability calculation unit 35 applies the extracted communications log to the weighting rule set of the scenario "WinRM/Short-term/Rule 1" and calculates the propagation probability. As a result, the propagation probability of the node whose "DstPort" is 5985 or 5986 is calculated to be 0.7, and the reverse propagation probability of other nodes is calculated to be 0.2. As a result, an information propagation model is constructed as shown in FIG. 9C.

Next, as shown in FIG. 9D, the simulation execution unit 32 executes, for each node other than the infected node, for example 100 times, a simulation using the information propagation model shown in FIG. 9C. In the simulation, the number of propagations in which the infected node propagated the malware to the other node is calculated.

Specifically, because the number of times the simulation is executed is 100, the simulation execution unit 32, in each simulation instance t=0, 1, 2, . . . 100, determines whether or not the infected node caused each node to be infected with the malware, based on the propagation probability of each node. The number of times it is determined that the infected node caused the malware to propagate to each node is used as the number of propagations.

The score calculation unit 36 calculates a score $S_t$ by using the number of reverse propagations and the number of propagations for each node other than the infected node. Specifically, where a node identifier is represented as i (where i is an arbitrary natural number), the "number of reverse propagations/number of simulation executions" is represented as $S_r(i)$, and "number of propagations/number of simulation executions" is represented as $S_p(i)$, the score calculation unit 36 calculates the score $S_t$ by using below Formula 1 or 2. Formula 1 is used when the score is calculated based on the average value of the number of reverse propagations and the number of propagations. Formula 2 is used when the score is calculated by assigning a weight $\alpha(\in[0,1])$.

$$S_t = (S_r(i) + S_p(i))/2 \quad [\text{Formula 1}]$$

$$S_t = \{\alpha S_r(i) + (1-\alpha) S_p(i)\}/2 \quad [\text{Formula 2}]$$

Apparatus Operations

Next, operation of the impact range estimation apparatus 30 according to the second example embodiment of the present invention will be described with reference to FIG. 10. FIG. 10 is a flowchart showing operation of the impact range estimation apparatus according to the second example embodiment of the present invention. In the following description, FIGS. 8 and 9 will be referred to as appropriate. Further, in the second example embodiment, an impact range estimation method is implemented by operating the impact range estimation apparatus 30. Therefore, the description of the impact range estimation method in the second example embodiment is replaced with the following description of the operation of the impact range estimation apparatus 30.

Figure 10:
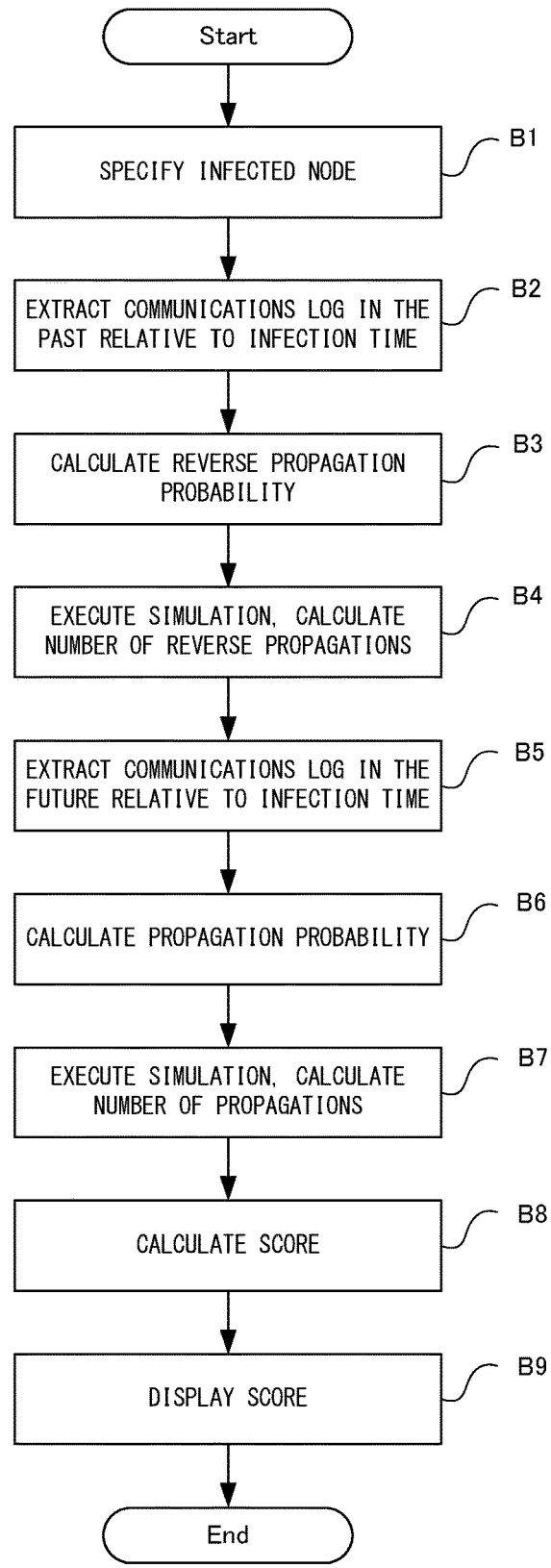
FIG. 10 is a flowchart showing operation of the impact range estimation apparatus according to the second example embodiment of the present invention.

As shown in FIG. 10, first, the reverse propagation probability calculation unit 31 acquires the infection information transmitted from the management apparatus 23, and from the acquired infection information, specifies the infected node infected with the malware (step B1). Also, in step B1, the reverse propagation probability calculation unit 31 also specifies the infection time when the infected node was infected with the malware. Step B1 is the same step as step A1 shown in FIG. 7.

Next, based on the communications history stored in the communications history database 34, the reverse propagation probability calculation unit 31 extracts the communications log in the past relative to the infection time (step B2). Also, in step B2, the reverse propagation probability calculation unit 31 specifies the direction of communications in the extracted communications log, that is, the source and destination. Step B2 is the same step as step A2 shown in FIG. 7.

Next, the reverse propagation probability calculation unit 31 swaps the communications direction in the communications log extracted in step B2, and in that state, applies the weighting rule set of the designated scenario, and calculates the reverse propagation probability for each node other than the infected node (step B3). Step B3 is the same step as step A3 shown in FIG. 7.

Next, the simulation execution unit 32 executes, a set number of times, a simulation in which the malware is propagated to the infected node, using the reverse propagation probability calculated in step B3, for each node other than the infected node. Then, the simulation execution unit 32, from the simulation results, for each other node, calculates the number of reverse propagations in which the other node caused the malware to propagate to the infected node in the simulations (step B4). Step B4 is the same step as step A4 shown in FIG. 7.

Next, the propagation probability calculation unit 35 receives the information regarding the infected node and the infection time specified in step B1, and extracts the communications logs in the future relative to the infection time based on the communications history stored in the communications history database 34 (step B5).

Next, the propagation probability calculation unit 35 applies the weighting rule set of the designated scenario to the communications log extracted in step B5, and calculates the propagation probability for each node other than the infected node (step B6).

Next, the simulation execution unit 32 executes, a set number of times, a simulation in which the malware is propagated from the infected node to another node, using the propagation probability calculated in step B6, for each node other than the infected node. Then, the simulation execution unit 32, from the simulation results, for each other node, calculates the number of propagations in which the malware propagated from the infected node to that other node in the simulations (step B7).

Next, the score calculation unit 36 calculates the score $S_t$ by using the number of reverse propagations calculated in step B4 and the number of propagations calculated in step B7, for each node other than the infected node (step B8).

Afterward, the score calculation unit 36 displays the score of each node calculated in step B8 on the screen of the terminal device used by the administrator of the network system 20, for example (step B9). By executing step B9, the processing in the impact range estimation apparatus 10 is temporarily ended, but when another node is newly infected with the malware, step B1 is executed again.

Effects of Second Example Embodiment

As described above, in the second example embodiment, when a certain node becomes an infected node, the impact range estimation apparatus 30 executes a simulation and calculates the number of reverse propagations and the number of propagations, and furthermore, from these numbers calculates scores, and presents the scores to the administrator of the network system 20. Therefore, the administrator of the network system 20 can estimate the range of impact due to the malware from the displayed scores. Accordingly, also when using the second example embodiment, similarly to the first example embodiment, when malware invades a network system, without imposing a burden on an administrator, it is possible to improve accuracy when the administrator estimates the range of impact of the malware.

[Program]

The program according to the second example embodiment may be a program that causes a computer to execute steps B1 to B9 shown in FIG. 10. By installing this program in a computer and executing the program, the impact range estimation apparatus 30 and the impact range estimation method according to the second example embodiment can be realized. In this case, a processor of the computer performs processing to function as the reverse propagation probability calculation unit 31, the simulation execution unit 32, the propagation probability calculation unit 35, and the score calculation unit 36.

Further, in the second example embodiment, the scenario information database 33 and the communications history database 34 can be realized by storing data files that form those databases in a storage device such as a hard disk provided in the computer.

Also, the program according to the second example embodiment may be executed by a computer system constructed by a plurality of computers. In this case, for example, each computer may respectively function as any of the reverse propagation probability calculation unit 31, the simulation execution unit 32, the propagation probability calculation unit 35, and the score calculation unit 36. Further, the scenario information database 33 and the communications history database 34 may be constructed on a computer different from the computer that executes the program according to the second example embodiment.

Third Example Embodiment

Next, an impact range estimation apparatus, an impact range estimation method, and a computer-readable recording medium according to the third example embodiment of the present invention will be described with reference to FIGS. 11 to 13.

Apparatus Configuration

First, the configuration of an impact range estimation apparatus 40 according to the third example embodiment will be described. FIG. 11 is a block diagram showing the configuration of the impact range estimation apparatus according to the third example embodiment of the present invention.

Figure 11:
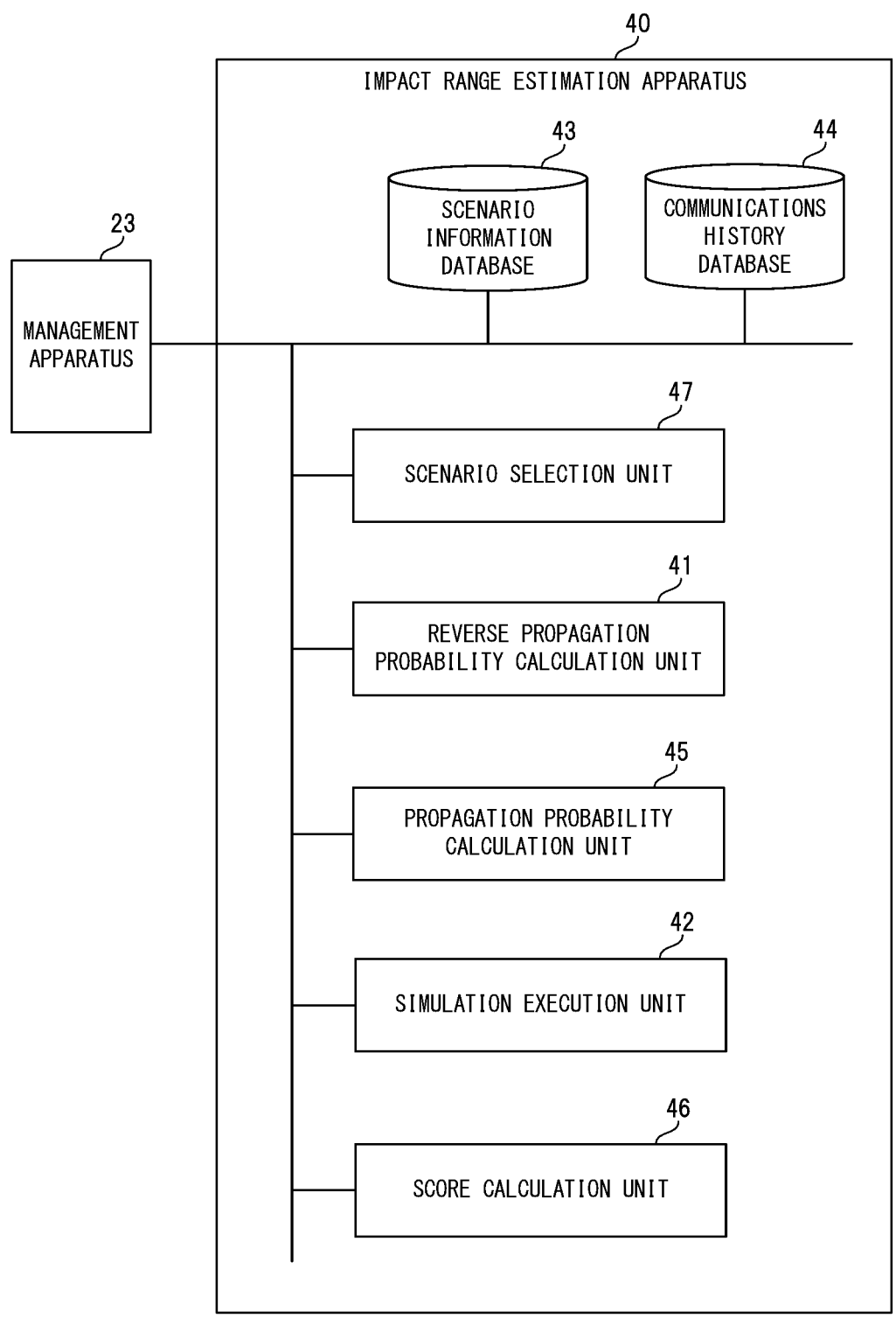
FIG. 11 is a block diagram showing the configuration of an impact range estimation apparatus according to a third example embodiment of the present invention.

As shown in FIG. 11, the impact range estimation apparatus 40 in the third example embodiment includes a reverse propagation probability calculation unit 41, a simulation execution unit 42, a scenario information database 43, a communications history database 44, a propagation probability calculation unit 45, and a score calculation unit 46. These have the same functions as the reverse propagation probability calculation unit 31, the simulation execution unit 32, the scenario information database 33, the communications history database 34, the propagation probability calculation unit 35, and the score calculation unit 36 shown in FIG. 8 in the second example embodiment. With respect to these points, the impact range estimation apparatus 40 in the third example embodiment is the same as the impact range estimation apparatus 30 in the second example embodiment shown in FIG. 8.

However, in the third example embodiment, the impact range estimation apparatus 40 further includes a scenario selection unit 47 in addition to the above configuration, and with respect to these points, the impact range estimation apparatus 40 differs from the impact range estimation apparatus 30 in the second example embodiment. Below, mainly the differences from the second example embodiment will be described.

First, as shown in FIG. 4, even in the third example embodiment, the scenario information includes a plurality of scenarios for each pattern of attack by malware. The scenario selection unit 47 functions in this case.

The scenario selection unit 47 first acquires infection information that specifies an infected node infected with malware from the management apparatus 23. Next, the scenario selection unit 47 uses the acquired infection information to calculate, for each scenario, the possibility that the scenario matches the pattern of an actual attack by malware as a scenario matching score.

Then, the scenario selection unit 47 selects the scenario with the highest calculated scenario matching score as a matching scenario. Further, in the third example embodiment, the reverse propagation probability calculation unit 41 and the propagation probability calculation unit 45 execute calculation processing using the scenario selected by the scenario selection unit 47.

Here, the processing by the scenario selection unit 47 will be specifically described with reference to FIG. 12. FIG. 12 illustrates the scenario selection processing in the third example embodiment. In FIG. 12, some of the nodes forming the network system 20 are observed by the management apparatus 23, and it is determined whether or not those nodes are infected with malware. In this case, the management apparatus 23 transmits infection information indicating the presence or absence of malware infection in each of the observed nodes to the impact range estimation apparatus 40.

When the infection information is transmitted, the scenario selection unit 47 first selects one of the plurality of prepared scenarios. Next, within the range of the observed nodes, the scenario selection unit 47 uses the selected scenario to cause the reverse propagation probability calculation unit 41, the propagation probability calculation unit 45, the simulation execution unit 42, and the score calculation unit 46 to execute processing and calculate scores for each node. Further, in this case, the scenario selection unit 47 may select a randomly observed node and cause the score to be calculated only for the selected node. Further, the scenario selection unit 47 performs similar processing also regarding remaining scenarios that have not yet been selected, and calculates scores.

Next, the scenario selection unit 47, for each scenario, applies the score of each node to the following Formula 3 and calculates a scenario matching score $DCG_P$. Then, the scenario selection unit 47 selects the scenario with the highest scenario matching score $DCG_P$ as the matching scenario. Also note that P indicates the number of observed nodes. The value of "$rel_i$" is "1" in the case of an infected node and "0" in the case of an uninfected node.

$$DCG_P = \sum_{i=1}^{P} \frac{rel_i}{\log_2(i+1)} \quad \text{[Formula 3]}$$

Apparatus Operations

Next, operation of the impact range estimation apparatus 40 according to the third example embodiment of the present invention will be described with reference to FIG. 13. FIG. 13 is a flowchart showing operation of the impact range estimation apparatus according to the third example embodiment of the present invention. In the following description, FIGS. 11 and 12 will be referred to as appropriate. Further, in the third example embodiment, an impact range estimation method is implemented by operating the impact range estimation apparatus 40. Therefore, the description of the impact range estimation method in the third example embodiment is replaced with the following description of the operation of the impact range estimation apparatus 40.

Figure 13:
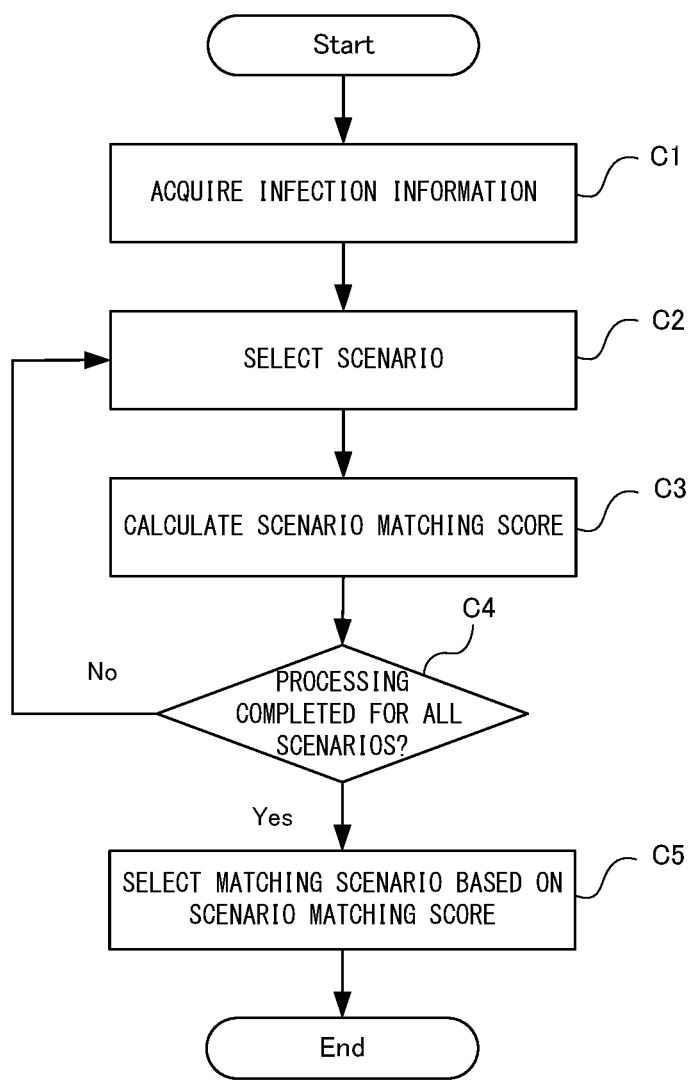
FIG. 13 is a flowchart showing operation of the impact range estimation apparatus according to the third example embodiment of the present invention.

As shown in FIG. 13, first, the scenario selection unit 47 acquires infection information that specifies an infected node infected with the malware from the management apparatus 23 (step C1). Next, the scenario selection unit 47 selects one scenario from the scenario information stored in the scenario information database (step C2).

Next, the scenario selection unit 47 calculates a scenario matching score using the scenario selected in step C2 and the infection information acquired in step C1 (step C3). Specifically, in step C3, within the range of the observed nodes, the scenario selection unit 47 uses the scenario selected in step C2 to cause the reverse propagation probability calculation unit 41, the propagation probability calculation unit 45, the simulation execution unit 42, and the score calculation unit 46 to execute processing and calculate scores for each node. Further, the scenario selection unit 47 applies the score of each node in the above Formula 3 to calculate the scenario matching score.

Next, the scenario selection unit 47 determines whether or not the processing has been completed for all of the scenarios stored in the scenario information database (step C4). When the result of the determination in step C4 is that the processing is not completed for all of the scenarios stored in the scenario information database, the scenario selection unit 47 executes step C2 again.

On the other hand, when the result of the determination in step C4 is that the processing is completed for all of the scenarios stored in the scenario information database, the scenario selection unit 47 specifies the scenario with the highest scenario matching score, and selects the specified scenario as the matching scenario (step C5).

When step C5 is completed, steps B1 to B9 shown in FIG. 10 in the second example embodiment are executed by the reverse propagation probability calculation unit 41, the simulation execution unit 42, the propagation probability calculation unit 45, and the score calculation unit 46, using the matching scenario selected in above step C5.

Effects of Third Example Embodiment

As described above, in the third example embodiment, the appropriate scenario is automatically selected, so the burden on the administrator of the network system is further reduced. Also, in the third example embodiment the same effects as in the second example embodiment can be obtained.

[Program]

The program according to the third example embodiment may be a program that causes a computer to execute steps B1 to B9 shown in FIG. 10, and steps C1 to C5 shown in FIG. 13. By installing this program in a computer and executing the program, the impact range estimation apparatus 40 and the impact range estimation method according to the third example embodiment can be realized. In this case, a processor of the computer performs processing to function as the reverse propagation probability calculation unit 41, the simulation execution unit 42, the propagation probability calculation unit 45, the score calculation unit 46, and the scenario selection unit 47.

Further, in the third example embodiment, the scenario information database 43 and the communications history database 44 can be realized by storing data files that form those databases in a storage device such as a hard disk provided in the computer.

Also, the program according to the third example embodiment may be executed by a computer system constructed by a plurality of computers. In this case, for example, each computer may respectively function as any of the reverse propagation probability calculation unit 41, the simulation execution unit 42, the propagation probability calculation unit 45, the score calculation unit 46, and the scenario selection unit 47. Further, the scenario information database 43 and the communications history database 44 may be constructed on a computer different from the computer that executes the program according to the third example embodiment.

(Physical Configuration)

Figure 14:
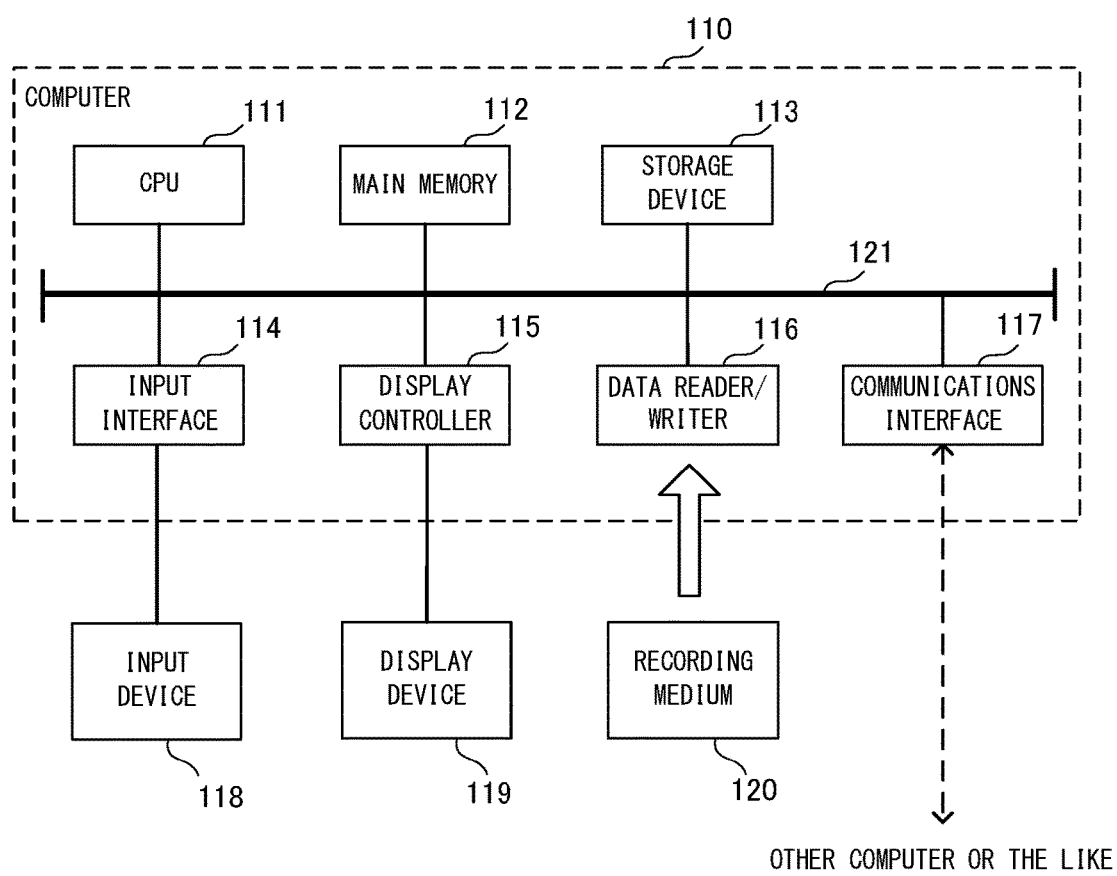
FIG. 14 is a block diagram showing an example of a computer that realizes the impact range estimation apparatus according to the first to third example embodiments of the present invention.

Here, a computer that realizes an impact range estimation apparatus by executing the program according to the first to third example embodiments will be described with reference to FIG. 14. FIG. 14 is a block diagram showing an example of a computer that realizes the impact range estimation apparatus according to the first to third example embodiments of the present invention.

As shown in FIG. 14, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (codes) according to these example embodiments, which has been stored in the storage device 113, in the main memory 112 and performs various operations by executing the code in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the impact range estimation apparatus according to the first to third example embodiments can also be realized by using hardware corresponding to each unit. Furthermore, a portion of the impact range estimation apparatus may be realized by a program, and the remaining portion realized by hardware.

Some portion or all of the example embodiments described above can be realized according to (supplementary note 1) to (supplementary note 15) described below, but the below description does not limit the invention.

(Supplementary Note 1)

An impact range estimation apparatus that estimates a range of impact due to infection by malware in a network system with a plurality of nodes, the impact range estimation apparatus including:

a reverse propagation probability calculation unit configured to, when a specific node is infected with the malware, based on scenario information that specifies a pattern of attack by the malware and a communications log in the network system before infection by the malware, for each node other than the specific node, calculate a probability that the malware propagates from that other node to the specific node; and a simulation execution unit configured to, using the calculated probability, execute a plurality of times a simulation in which the malware is propagated to the specific node, and for each other node regarding which the probability was calculated, calculate a number of times that the other node becomes a propagation source of the malware.

(Supplementary Note 2)

The impact range estimation apparatus according to supplementary note 1, further including:

a propagation probability calculation unit configured to, when the specific node is infected with the malware, based on the scenario information and the communications log after the malware infection, for each other node, calculate a second probability that the malware propagates to that other node;

wherein the simulation execution unit is configured to further, using the calculated second probability, execute a plurality of times a simulation in which the malware propagates from the specific node to the other node, and for each other node regarding which the second probability was calculated, calculate a number of times that the other node becomes a propagation destination of the malware.

(Supplementary Note 3)

The impact range estimation apparatus according to supplementary note 2, further including:

a score calculation unit configured to calculate a score for each other node using the number of times that the other node becomes a propagation source of the malware and the number of times that the other node becomes a propagation destination of the malware.

(Supplementary Note 4)

The impact range estimation apparatus according to supplementary note 2 or 3, further including:

a scenario selection unit configured to, when the scenario information includes a plurality of scenarios of each pattern of attack by the malware, acquire information that specifies a node infected by the malware, and using the acquired information, for each of the plurality of scenarios, calculate a possibility that the scenario matches the actual pattern of attack by the malware as a scenario matching score, and select the scenario for which the calculated scenario matching score is highest;

wherein the reverse propagation probability calculation unit and the propagation probability calculation unit use the selected scenario.

(Supplementary Note 5)

The impact range estimation apparatus according to any of supplementary notes 1 to 4, wherein the scenario information specifies a destination port of a node infected by the malware as a pattern of attack by the malware.

(Supplementary Note 6)

An impact range estimation method for estimating a range of impact due to infection by malware in a network system with a plurality of nodes, the impact range estimation method including:

(a) a step of, when a specific node is infected with the malware, based on scenario information that specifies a pattern of attack by the malware and a communications log in the network system before infection by the malware, for each node other than the specific node, calculating a probability that the malware propagates from that other node to the specific node; and (b) a step of, using the calculated probability, executing a plurality of times a simulation in which the malware is propagated to the specific node, and for each other node regarding which the probability was calculated, calculating a number of times that the other node becomes a propagation source of the malware.

(Supplementary Note 7)

The impact range estimation method according to supplementary note 6, further including:

(c) a step of, when the specific node is infected with the malware, based on the scenario information and the communications log after the malware infection, for each other node, calculating a second probability that the malware propagates to that other node; and (d) a step of, using the calculated second probability, executing a plurality of times a simulation in which the malware propagates from the specific node to the other node, and for each other node regarding which the second probability was calculated, calculating a number of times that the other node becomes a propagation destination of the malware.

(Supplementary Note 8)

The impact range estimation method according to supplementary note 7, further including:

(e) a step of calculating a score for each other node using the number of times that the other node becomes a propagation source of the malware and the number of times that the other node becomes a propagation destination of the malware.

(Supplementary Note 9)

The impact range estimation method according to supplementary note 7 or 8, further including:

(f) a step of, when the scenario information includes a plurality of scenarios of each pattern of attack by the malware, acquiring information that specifies a node infected by the malware, and using the acquired information, for each of the plurality of scenarios, calculating a possibility that the scenario matches the actual pattern of attack by the malware as a scenario matching score, and selecting the scenario for which the calculated scenario matching score is highest;

wherein the selected scenario is used in the (a) step and the (c) step.

(Supplementary Note 10)

The impact range estimation method according to any of supplementary notes 6 to 9, wherein the scenario information specifies a destination port of a node infected by the malware as a pattern of attack by the malware.

(Supplementary Note 11)

A computer-readable recording medium including a program for estimating a range of impact due to infection by malware in a network system with a plurality of nodes, the program being recorded on the computer-readable recording medium and including instructions that cause the computer to carry out:

(a) a step of, when a specific node is infected with the malware, based on scenario information that specifies a pattern of attack by the malware and a communications log in the network system before infection by the malware, for each node other than the specific node, calculating a probability that the malware propagates from that other node to the specific node; and (b) a step of, using the calculated probability, executing a plurality of times a simulation in which the malware is propagated to the specific node, and for each other node regarding which the probability was calculated, calculating a number of times that the other node becomes a propagation source of the malware.

(Supplementary Note 12)

The computer-readable recording medium according to supplementary note 11, the program further including instructions that cause the computer to carry out:

(c) a step of, when the specific node is infected with the malware, based on the scenario information and the communications log after the malware infection, for each other node, calculating a second probability that the malware propagates to that other node; and (d) a step of, using the calculated second probability, executing a plurality of times a simulation in which the malware propagates from the specific node to the other node, and for each other node regarding which the second probability was calculated, calculating a number of times that the other node becomes a propagation destination of the malware.

(Supplementary Note 13)

The computer-readable recording medium according to supplementary note 12, the program further including instructions that cause the computer to carry out:

(e) a step of calculating a score for each other node using the number of times that the other node becomes a propagation source of the malware and the number of times that the other node becomes a propagation destination of the malware.

(Supplementary Note 14)

The computer-readable recording medium according to supplementary note 12 or 13, the program further including instructions that cause the computer to carry out:

(f) a step of, when the scenario information includes a plurality of scenarios of each pattern of attack by the malware, acquiring information that specifies a node infected by the malware, and using the acquired information, for each of the plurality of scenarios, calculating a possibility that the scenario matches the actual pattern of attack by the malware as a scenario matching score, and selecting the scenario for which the calculated scenario matching score is highest;

wherein the selected scenario is used in the (a) step and the (c) step.

(Supplementary Note 15)

The computer-readable recording medium according to any of supplementary notes 11 to 14, wherein the scenario information specifies a destination port of a node infected by the malware as a pattern of attack by the malware.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

INDUSTRIAL APPLICABILITY

As described above, according to the present invention, when malware invades a network system, it is possible to improve the accuracy of estimating a range of impact of the malware without imposing a burden on an administrator. The present invention is useful in various network systems.

REFERENCE SIGNS LIST

10 Impact range estimation apparatus (first example embodiment)
11 Reverse propagation probability calculation unit
12 Simulation execution unit
13 Scenario information database
14 Communications history database
20 Network system
21 Switch
22 Node
23 Management apparatus
30 Impact range estimation apparatus (second example embodiment)
31 Reverse propagation probability calculation unit
32 Simulation execution unit
33 Scenario information database
34 Communications history database
35 Propagation probability calculation unit
36 Score calculation unit
40 Impact range estimation apparatus (third example embodiment)
41 Reverse propagation probability calculation unit
42 Simulation execution unit
43 Scenario information database
44 Communications history database
45 Propagation probability calculation unit
46 Score calculation unit
47 Scenario selection unit
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. An impact range estimation apparatus that estimates a range of impact due to infection by malware in a network system with a plurality of nodes, the impact range estimation apparatus comprising:
a reverse propagation probability calculation unit configured to, when a specific node is infected with the malware, based on scenario information that specifies a pattern of attack by the malware and a communications log in the network system before infection by the malware, for each node other than the specific node, calculate a probability that the malware propagates from that other node to the specific node; and
a simulation execution unit configured to, using the calculated probability, execute a plurality of times a simulation in which the malware is propagated to the specific node, and for each other node regarding which the probability was calculated, calculate a number of times that the other node becomes a propagation source of the malware.

2. The impact range estimation apparatus according to claim 1, further comprising:
a propagation probability calculation unit configured to, when the specific node is infected with the malware, based on the scenario information and the communications log after the malware infection, for each other node, calculate a second probability that the malware propagates to that other node;
wherein the simulation execution unit is configured to further, using the calculated second probability, execute a plurality of times a simulation in which the malware propagates from the specific node to the other node, and for each other node regarding which the second probability was calculated, calculate a number of times that the other node becomes a propagation destination of the malware.

3. The impact range estimation apparatus according to claim 2, further comprising:
a score calculation unit configured to calculate a score for each other node using the number of times that the other node becomes a propagation source of the malware and the number of times that the other node becomes a propagation destination of the malware.

4. The impact range estimation apparatus according to claim 2, further comprising:
a scenario selection unit configured to, when the scenario information includes a plurality of scenarios of each pattern of attack by the malware, acquire information that specifies a node infected by the malware, and using the acquired information, for each of the plurality of scenarios, calculate a possibility that the scenario matches the actual pattern of attack by the malware as a scenario matching score, and select the scenario for which the calculated scenario matching score is highest;
wherein the reverse propagation probability calculation unit and the propagation probability calculation unit use the selected scenario.

5. The impact range estimation apparatus according to claim 1,
wherein the scenario information specifies a destination port of a node infected by the malware as a pattern of attack by the malware.

6. An impact range estimation method for estimating a range of impact due to infection by malware in a network system with a plurality of nodes, the impact range estimation method comprising:
when a specific node is infected with the malware, based on scenario information that specifies a pattern of attack by the malware and a communications log in the network system before infection by the malware, for each node other than the specific node, calculating a probability that the malware propagates from that other node to the specific node; and
using the calculated probability, executing a plurality of times a simulation in which the malware is propagated to the specific node, and for each other node regarding which the probability was calculated, calculating a number of times that the other node becomes a propagation source of the malware.

7. The impact range estimation method according to claim 6, further comprising:
when the specific node is infected with the malware, based on the scenario information and the communications log after the malware infection, for each other node, calculating a second probability that the malware propagates to that other node; and
using the calculated second probability, executing a plurality of times a simulation in which the malware propagates from the specific node to the other node, and for each other node regarding which the second probability was calculated, calculating a number of times that the other node becomes a propagation destination of the malware.

8. The impact range estimation method according to claim 7, further comprising:
calculating a score for each other node using the number of times that the other node becomes a propagation source of the malware and the number of times that the other node becomes a propagation destination of the malware.

9. The impact range estimation method according to claim 7, further comprising:
when the scenario information includes a plurality of scenarios of each pattern of attack by the malware, acquiring information that specifies a node infected by the malware, and using the acquired information, for each of the plurality of scenarios, calculating a possibility that the scenario matches the actual pattern of attack by the malware as a scenario matching score, and selecting the scenario for which the calculated scenario matching score is highest;
wherein the selected scenario is used.

10. The impact range estimation method according to claim 6,
wherein the scenario information specifies a destination port of a node infected by the malware as a pattern of attack by the malware.

11. A non-transitory computer-readable recording medium including a program for estimating a range of impact due to infection by malware in a network system with a plurality of nodes, the program being recorded on the computer-readable recording medium and including instructions that cause the computer to carry out:
when a specific node is infected with the malware, based on scenario information that specifies a pattern of attack by the malware and a communications log in the network system before infection by the malware, for each node other than the specific node, calculating a probability that the malware propagates from that other node to the specific node; and
using the calculated probability, executing a plurality of times a simulation in which the malware is propagated to the specific node, and for each other node regarding which the probability was calculated, calculating a number of times that the other node becomes a propagation source of the malware.

12. The non-transitory computer-readable recording medium according to claim 11, the program further including instructions that cause the computer to carry out:
   when the specific node is infected with the malware, based on the scenario information and the communications log after the malware infection, for each other node, calculating a second probability that the malware propagates to that other node; and
   using the calculated second probability, executing a plurality of times a simulation in which the malware propagates from the specific node to the other node, and for each other node regarding which the second probability was calculated, calculating a number of times that the other node becomes a propagation destination of the malware.

13. The non-transitory computer-readable recording medium according to claim 12, the program further including instructions that cause the computer to carry out:
   calculating a score for each other node using the number of times that the other node becomes a propagation source of the malware and the number of times that the other node becomes a propagation destination of the malware.

14. The non-transitory computer-readable recording medium according to claim 12, the program further including instructions that cause the computer to carry out:
   when the scenario information includes a plurality of scenarios of each pattern of attack by the malware, acquiring information that specifies a node infected by the malware, and using the acquired information, for each of the plurality of scenarios, calculating a possibility that the scenario matches the actual pattern of attack by the malware as a scenario matching score, and selecting the scenario for which the calculated scenario matching score is highest;
   wherein the selected scenario is used.

15. The non-transitory computer-readable recording medium according to claim 11,
   wherein the scenario information specifies a destination port of a node infected by the malware as a pattern of attack by the malware.

* * * * *